Nov. 20, 1928.
H. Y. NORWOOD
THERMOMETER
Filed Jan. 5, 1925
1,692,381
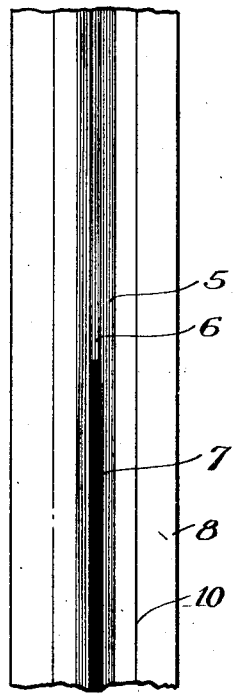
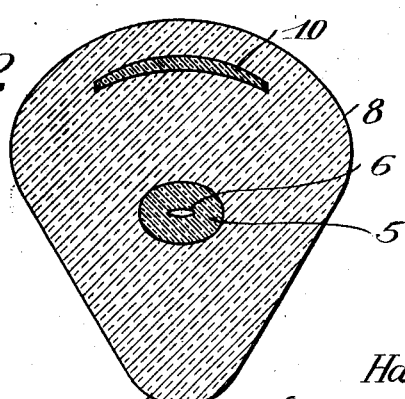
Inventor
Harry Y. Norwood
By
his Attorney Patented Nov. 20, 1928.

1,692,381

UNITED STATES PATENT OFFICE.

HARRY Y. NORWOOD, OF AVON, NEW YORK, ASSIGNOR TO TAYLOR INSTRUMENT COMPANIES, INC., OF ROCHESTER, NEW YORK, A CORPORATION OF NEW YORK.

THERMOMETER.

Application filed January 5, 1925. Serial No. 476.

This invention relates to thermometers of the variety comprising a fluid filled bulb and stem in which latter the expansible fluid rises and falls to indicate the temperature, and concerns more particularly the construction of the indicating stem portion, one object of the invention being to provide a thermometer of this class having an improved stem construction for rendering the fluid column more conspicuously visible and thus increasing the accuracy of the instrument in use, as well as a construction of a practical character from the point of view of commercial production. Another object is the provision of a simple, practical and economical method for producing a thermometer of the above character. To these and other ends the invention resides in certain improvements and combinations of parts, all as will be hereinafter more fully described, the novel features being pointed out in the claims at the end of the specification.

In the drawings:—

Figure 1 is an elevation of a portion of a thermometer stem embodying the present invention, and Figure 2 is an enlarged sectional plan view of the same.

Similar reference numerals throughout the several views indicate the same parts.

Thermometers of the class described have been constructed with various expedients for increasing the visibility of the relatively thin fluid column, so that the indicating upper end thereof may be readily located on the temperature scale with which the stem is usually provided, including the use of various arrangements of colored grounds back of the bore or fluid column for rendering the latter more readily apparent. It has been found that the desired result may be accomplished with a higher degree of efficiency and on a practical form of construction from the point of view of manufacturing requirements by forming the bore of the stem in a thin walled, inner tube of glass of a distinctly different appearance or color from the main body of glass enclosing the inner tube and forming the body of the stem.

Referring more particularly to the drawings, there is shown at 5 an inner relatively thin walled tube of colored glass containing the bore 6 in which the fluid column 7 rises and falls. This inner tube is surrounded by the main portion 8 of preferably colorless glass constituting the main body of the stem which is formed in the usual manner to provide the lenticular portion 9 at its forward side for magnifying the bore and liquid column, as well understood in the art. Back of the bore and preferably at some distance from it is a strip 10 of material contrasting in color with the inner tube 5 to afford a ground against which the latter may be distinctly seen. Ground 10 is preferably a film strip made up in the stem during manufacture, as well understood in the art.

The above construction lends itself to manufacture by the following convenient and practical method. A relatively small quantity of colored glass for the inner tube containing the bore is collected on the blow pipe and covered with a relatively large quantity of the glass for the main portion 8 of the stem. The mass meanwhile is worked and blown in the manner well known in the art to form the bore and to give the stem the desired lenticular shape and prepare it for drawing. During such shaping operation a small quantity of the glass 10 for the backing strip is applied to the back of the mass and covered with an additional amount of the glass forming the body of the stem. When the parts have been thus properly arranged and shaped, the mass is drawn in the usual manner and affords a stem of the construction described above.

The terms "colored" and "colorless" are used herein in a broad sense. The main body portion 8 of the stem should have a high degree of transparency so that it is preferred to employ for this portion a substantially colorless glass and to employ for the inner tube a glass of sufficient transparency to enable the fluid column to be readily seen and at the same time of a tint or color, opalescent or otherwise, contrasting sufficiently with the appearance of the main body portion 8 and with the fluid column to render the latter and inner tube distinctly visible as an aid in locating the fluid column. The inner tube completely surrounds the bore as shown, and while of relatively small size, is substantially wider or thicker than the bore so that it catches the eye more quickly and thus indicates the bore or fluid column located centrally within it. The backing strip is preferably in the form of an arc of substantial length located at some distance back of the inner tube as shown in Figure 2, so as to form a field or ground for the inner tube through a relatively wide angle of observation. This strip may be of white or opalescent glass different in color or appearance from that of the inner tube and fluid column.

The invention thus provides a thermometer stem of a comparatively simple and highly effective character adapted to render the fluid column conspicuously visible and easy to locate and to render the top of the column strikingly apparent by the contrast between the column and the glass of the inner tube and backing strip. In addition to the above and other advantages of the construction it is capable of being readily manufactured for commercial production and the invention provides also a simple, practical and efficient method for its manufacture.

I claim as my invention:

1. In a thermometer, a stem comprising an inner tubular portion and an outer tubular portion, the inner portion defining the bore and being formed by a relatively thin wall of colored glass.

2. In a thermometer, a stem comprising an inner tubular portion and an outer tubular portion, the inner portion defining the bore and being formed by a relatively thin wall of colored glass and the outer portion having a lenticular surface portion coextensive with the bore.

HARRY Y. NORWOOD.